United States Patent
Matsushita

(10) Patent No.: US 10,577,514 B2
(45) Date of Patent: Mar. 3, 2020

(54) CURABLE COMPOSITION AND CURED MATTER

(71) Applicant: Yuuki Matsushita, Kanagawa (JP)

(72) Inventor: Yuuki Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 174 days.

(21) Appl. No.: 15/923,659

(22) Filed: Mar. 16, 2018

(65) Prior Publication Data

US 2018/0273781 A1  Sep. 27, 2018

(30) Foreign Application Priority Data

Mar. 21, 2017  (JP) ................................ 2017-054757
Feb. 14, 2018  (JP) ................................ 2018-023952

(51) Int. Cl.
| | |
|---|---|
| *C09D 11/107* | (2014.01) |
| *C09D 11/38* | (2014.01) |
| *C08L 35/02* | (2006.01) |
| *C09D 11/104* | (2014.01) |
| *C09D 11/101* | (2014.01) |
| *C09D 11/108* | (2014.01) |
| *C09D 133/06* | (2006.01) |
| *C09D 11/106* | (2014.01) |

(52) U.S. Cl.
CPC ............ *C09D 11/107* (2013.01); *C08L 35/02* (2013.01); *C09D 11/101* (2013.01); *C09D 11/104* (2013.01); *C09D 11/106* (2013.01); *C09D 11/108* (2013.01); *C09D 11/38* (2013.01); *C09D 133/066* (2013.01)

(58) Field of Classification Search
CPC .................................................. C09D 11/107
See application file for complete search history.

(56) References Cited

U.S. PATENT DOCUMENTS

| 4,042,386 | A | * | 8/1977 | Okai | ....................... | G03F 7/027 |
|---|---|---|---|---|---|---|
| | | | | | | 430/281.1 |
| 2015/0042731 | A1 | | 2/2015 | Hiraoka | | |
| 2015/0099819 | A1 | | 4/2015 | Hiraoka | | |
| 2016/0297912 | A1 | | 10/2016 | Hiraoka | | |
| 2016/0319140 | A1 | | 11/2016 | Hiraoka | | |
| 2016/0369116 | A1 | | 12/2016 | Iio et al. | | |
| 2017/0008325 | A1 | | 1/2017 | Hiraoka et al. | | |
| 2017/0022378 | A1 | | 1/2017 | Iio et al. | | |
| 2017/0073445 | A1 | | 3/2017 | Hiraoka | | |
| 2017/0107385 | A1 | | 4/2017 | Kumai et al. | | |
| 2017/0260405 | A1 | | 9/2017 | Kumai et al. | | |
| 2018/0016454 | A1 | * | 1/2018 | Matsushita | ............... | C08F 2/50 |

FOREIGN PATENT DOCUMENTS

| JP | 2013-181114 | | 9/2013 |
|---|---|---|---|
| JP | 2013-256659 | | 12/2013 |
| WO | WO-2013172480 | A1 * | 11/2013 |

* cited by examiner

*Primary Examiner* — Mark S Kaucher
(74) *Attorney, Agent, or Firm* — Oblon, McClelland, Maier & Neustadt, L.L.P.

(57) ABSTRACT

A curable composition includes a polymerizable compound containing diethylene glycol dimethacrylate and a monofunctional (meth)acrylate having an OH group and a resin, wherein the resin satisfies the following (1) and (2), (1). a viscosity at 25 degrees C. of a liquid mixture of 70 parts of the diethylene glycol dimethacrylate and 30 parts of the resin is 15 to 27 times greater than that of the diethylene glycol dimethacrylate alone, and (2). the liquid mixture has a spin-spin relaxation time of 240 ms or less as measured by Carr-Purcell-Meiboom-Gill (CPMG) of pulse Nuclear Magnetic Resonance (NMR) analysis.

10 Claims, 2 Drawing Sheets

CURABLE COMPOSITION AND CURED MATTER

CROSS-REFERENCE TO RELATED APPLICATIONS

This patent application is based on and claims priority pursuant to 35 U.S.C. § 119 to Japanese Patent Application Nos. 2017-054757 and 2018-023952, filed on Mar. 21, 2017 and Feb. 14, 2018, respectively, in the Japan Patent Office, the entire disclosures of which are hereby incorporated by reference herein.

BACKGROUND

Technical Field

The present invention relates to a curable composition and cured matter.

Description of the Related Art

Curable compositions are typically used or supplied as ink for offset printing, ink for silk screen printing, top coating agents, etc. and appealing due to its contribution to cost reduction by simplification of drying processes and advantages such as reduction of volatile amounts of solvents, which is good for protection of the environment.

The curable composition typically contains a polymerizable compound and a polymerization initiator. In addition, a technology of mixing a photopolymerizable composition with a resin component has been proposed.

One of the advantages of mixing a photopolymerizable composition with a resin component is that an image or cured matter can be secured to adhere to a substrate of relatively plane plastic material, etc. into which the photopolymerizable composition does not easily permeate.

However, a solution containing a resin component has stringiness so that normal liquid droplets are not formed at discharging of a composition but leave a tail behind it. In a state in which a ligament is long, the end part of the tail is cut off and atomized, so that the liquid droplet lands on an area outside the target. Therefore, there are concerns that foul images are formed and liquid droplets are not discharged at high frequencies. Such problems do not occur if the length of a ligament is short but significantly occurs when the ligament has a length of 60 µs or longer.

In typical technologies, curable compositions mixed with resin components, having excellent discharging property, and demonstrating excellent adhesion to a substrate or glass which is not suitable for adhesion, have not been found out.

SUMMARY

According to the present invention, provided is an improved curable composition which includes a polymerizable compound containing diethylene glycol dimethacrylate and a mono-functional (meth)acrylate having an OH group and a resin, wherein the resin satisfies the following (1) and (2), (1). a viscosity at 25 degrees C. of a liquid mixture of 70 parts of the diethylene glycol dimethacrylate and 30 parts of the resin is 15 to 27 times greater than that of the diethylene glycol dimethacrylate alone, and (2). the liquid mixture has a spin-spin relaxation time of 240 ms or less as measured by Carr-Purcell-Meiboom-Gill (CPMG) of pulse Nuclear Magnetic Resonance (NMR) analysis.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
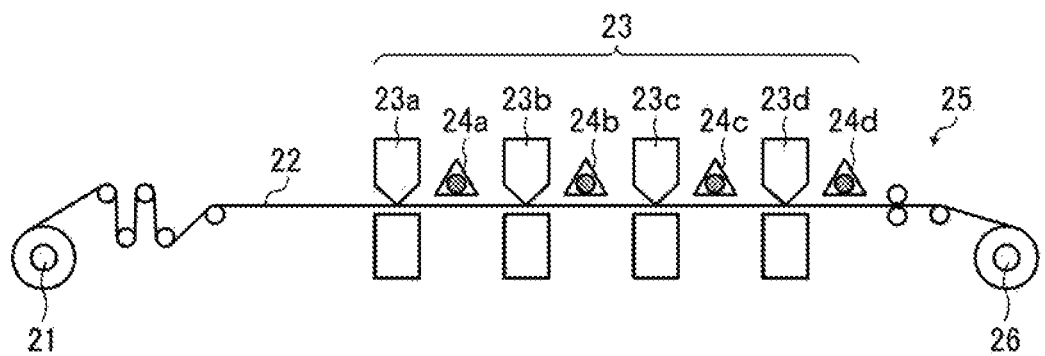
FIG. 1 is a schematic diagram illustrating an example of an image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present disclosure relates to the curable composition of 1 described below and also includes 2 to 12 below as embodiments of the present disclosure. Therefore, these are described as well.

1. A curable composition contains a polymerizable compound containing diethylene glycol dimethacrylate and a mono-functional (meth)acrylate having an OH group, wherein the resin satisfies the following conditions (1) and (2):

(1). The viscosity at 25 degrees C. of a liquid mixture of 70 parts of the diethylene glycol dimethacrylate and 30 parts of the resin is 15 to 27 times greater than that of the diethylene glycol dimethacrylate alone.

(2). The liquid mixture has a spin-spin relaxation time of 240 ms or less as measured by Carr-Purcell-Meiboom-Gill (CPMG) of pulse Nuclear Magnetic Resonance (NMR) analysis.

2. The curable composition according to 1 mentioned above, wherein the resin accounts for 5 to 20 parts by mass of a total of 100 parts of the diethylene glycol dimethacrylate, the mono-functional (meth)acrylate, and the resin.

3. The curable composition according to 1 or 2 mentioned above, wherein the resin accounts for 10 to 20 parts by mass of a total of 100 parts of the diethylene glycol dimethacrylate, the mono-functional (meth)acrylate, and the resin.

4. The curable composition according to any one of from 1 to 3, wherein the mono-functional (meth)acrylate includes a compound represented by the following Chemical formula 1 or Chemical formula 2.

$$CH_2\!=\!CR^1\!-\!COOR^2\!-\!OH \qquad \text{Chemical Formula 1}$$

$$CH_2\!=\!CR^1\!-\!CCO\!-\!CH_2R^3(OH)\!-\!CH_3 \qquad \text{Chemical Formula 2}$$

In the Chemical formulae, $R^1$ represents a hydrogen atom or a methyl group, $R^2$ represents an alkylene group having 1 to 4 carbon atoms, and $R^3(OH)$ represents a hydroxyalkylene group having 1 to 4 carbon atoms.

5. The curable composition according to any one of from 1 to 4 mentioned above, wherein the mono-functional (meth)acrylate is 2-hydroxyethylacrylate, 2-hydroxypropylacrylate, or 4-hydroxybutylacrylate.

6. The curable composition according to any one of from 1 to 3 mentioned above, wherein the mono-functional (meth)acrylate has a ring structure.

7. The curable composition according to 6 mentioned above, wherein the mono-functional (meth)acrylate includes a compound represented by the following Chemical formula 3:

$$CH_2\!=\!CR^1\!-\!COO\!-\!CH_2C(OH)R^4\!-\!$$
$$R^5\!-\!O\!-\!R^6 \qquad \text{Chemical Formula 3}$$

In the Chemical formula 3, $R^1$ represents a hydrogen atom or a methyl group, $R^4$ represents a hydrogen atom or a methyl group, $R^5$ represents an alkylene group having 1 to 4 carbon atoms, and $R^6$ represents a phenyl group or a cycloalkyl group having 3 to 12 carbon atoms.

8. The curable composition according to 6 or 7 mentioned above, wherein the mono-functional (meth)acrylate is 2-hydroxy-3-phenoxypropyl acrylate.

9. The curable composition according to any one of from 1 to 8 mentioned above, wherein the mono-functional (meth)acrylate accounts for 10 to 60 parts by mass of a total of 100 parts of the diethylene glycol dimethacrylate, the mono-functional (meth)acrylate, and the resin.

10. Cured matter of the curable composition of any one of from 1 to 9 mentioned above.

The curable composition of the present disclosure has excellent dischargeability. This mechanism is inferred as follows:

In the condition (1), when the liquid mixture has a viscosity 15 times or greater than that of diethylene glycol dimethacrylate alone, in other word, the increase of viscosity of at an addition of the resin in a particular amount to the diethylene glycol dimethacrylate is 15 times or greater than that of the diethylene glycol dimethacrylate alone, the molecule of the resin does not shrink but diffuses and is dissolved due to mutual action with the diethylene glycol dimethacrylate. Therefore, the entire of the resin molecule tends to receive the force conveyed at discharging, which is thought to lead to stable discharging. When the increase ratio surpasses 27 times, the viscosity excessively increases, for example, to a degree that the viscosity is out of the range suitable for ink for inkjet. As a result, the ink may not be discharged.

Viscosity can be measured by a cone-and-plate type rotary viscometer (VISCOMETER TVE-22L, manufactured by TOKI SANGYO CO., LTD.) using a cone rotor (1°34'×R24) at a number of rotation of 50 rpm with a temperature of hemathermal circulating water set at 25 degrees C. VISCOMATE VM-150III can be used for the temperature control of the circulating water.

In the condition (2), for a spin-spin relaxation time of 240 ms or less, affinity between the diethylene glycol dimethacrylate and the resin is good, thereby enhancing dischargeability. When the relaxation time surpasses 240 ms, molecular mobility is high, causing dischargeability to deteriorate. The spin-spin relaxation time is preferably from 180 to 240 ms.

In the condition 2, the difference due to the spin-spin relaxation time is significantly demonstrated for the liquid mixture in which 30 parts by mass of the resin is added to 70 parts by mass of the diethylene glycol dimethacrylate.

Pulse Nuclear Magnetic Resonance (NMR) analysis is a known diffusing method, which quickly measures the relaxation time (spin-lattice relaxation time (T1) of 1H nuclear having a direct relation with molecular mobility and the spin-spin relaxation time (T2). Carr-Purcell-Meiboom-Gill (CPMG) method, Hahn echo method, solid echo method, 90 pulse method, etc. are known as the pulse NMR analysis. In the present disclosure, CPMG method is employed suitable for measuring T2, which is long. According to CPMG method of pulse NMR analysis, a high frequency magnetic field is applied as a pulse to a solution loaded in an NMR tube to fall the magnetization vector. Based on the time (relaxation time) until the x component and y component are extinguished, the molecular mobility in the solution can be evaluated.

The detail of the measuring method of the spin-spin relaxation time in the present disclosure is described below.

A pulse NMR (Minispec mq series, manufactured by Bruker) is used as the measuring device.

A liquid mixture of 30 parts by mass of a resin and 70 parts by mass of diethylene glycol dimethacrylate is prepared and 1 mL thereof is weighed and loaded into an NMR tube having a diameter of 10 mm.

The NMR tube is set in the device and 5 seconds later, measuring starts. The solution is measured three times under the following condition and the average of the second time and the third time, the temperatures of which are stable, is used.

First 90 Pulse Separation: 0.01 msec
Final Pulse Separation: 0.2 msec
Number of Data Pint for Fitting: 3,000 points
Cumulated number: 32 times
Temperature: 25 degrees C.

Based on the obtained decay curve, using exponential approximation of ORIGIN 8.5 (manufactured by OriginLab), the spin-spin relaxation time (T2) is calculated.

The spin-spin relaxation time is short as molecular mobility decreases and the spin-spin relaxation time is long as molecular mobility increases.

Diethylene Glycol Dimethacrylate

The curable composition of the present disclosure contains diethylene glycol dimethacrylate. This lowers the viscosity of the composition and enhances adhesion against a substrate having not suitable adhesion property. Accordingly, the curability and the strength of cured matter can be enhanced.

In the present disclosure, (meth)acrylates other than diethylene glycol dimethacrylate can be optionally used as other monomer components.

The other components have no particular limit and can be suitably selected to suit to a particular application.

Specific examples include, but are not limited to, t-butyl (meth)acrylate, n-pentyl(meth)acrylate, n-hexyl(meth)acrylate, ethyleneglycoldi(meth)acrylate, hydroxy pivalic acid neopentylglycol di(meth)acrylate, γ-butylolactone acrylate, isobornyl (meth)acrylate, trimethylol propane(meth)acrylic acid benzoic acid ester, dipropylene glycoldi(meth)acrylate, 1,3-butanediol diacrylate, 1,4-butanediol di(meth)acrylate, 1,6-hexanediol di(meth)acrylate, 1,9-nonane di oldi(meth) acrylate, neopentylglycol di(meth)acrylate, tricyclodecane dimethanol diacrylate, propyleneoxide-modified bisphenol A di(meth)acrylate, (meth)acryloyl morpholine, propylene oxide-modified tetramethylol methane tetra(meth)acrylate, ditrimethylolpropane tetra(meth)acrylate, pentaerythritol tetra(meth)acrylate, trimethylol propane triacrylate, ethyleneoxide-modified trimethylol propane triacrylate, propyleneoxide-modified trimethylol propane tri(meth)acrylate, caprolactone-modified trimethylol propane tri(meth)acrylate, pentaerythritol tri(meth)acrylate, tris(2-hydroxyethyl) isocyanulate tri(meth)acrylate, ethoxified neopentyl glycol di(meth)acrylate, propyleneoxide-modified neopentylglycol di(meth)acrylate, propyleneoxide-modified glyceryl tri (meth)acrylate, polyester di(meth)acrylate, polyestertri (meth)acrylate, polyestertetra(meth)acrylate, polyester penta(meth)acrylate, polyesterpoly(meth)acrylate, N-vinylcaprolactone, N-vinyl pyrolidone, N-vinyl form ami de, polyurethane di(meth)acrylate, polyurethane tri(meth) acrylate, polyurethane tetra(meth)acrylate, polyurethane penta(meth)acrylate, polyurethane poly(meth)acrylate, triethylene glycol divinylether, cyclohexane dimethanol divinylether, cyclohexane dimethanol monovinylether, diethylene glycol divinylether, dicyclopentadien vinylether, tricyclodecane vinyl ether, benzylvinyl ether, ethyloxethane methylvinylether, triethylene glycol divinylether, and ethylvinylether.

The mixing ratio of diethylene glycol dimethacrylate is preferably from 20 to 80 percent by mass and more preferably from 30 to 70 percent by mass to the total amount a curable composition.

Mono-functional (Meth)acrylate Having OH Group (Meth)acrylate for use in the present disclosure has good adhesion property to glass because it is mono-functional having an OH group. The mechanism is inferred as follows. Polarity increases because of OH group so that adhesion property is enhanced to glass as a substrate having polarity. Moreover, it is mono-functional so that curing contract is small and inner stress decreases, thereby increasing adhesion property.

The mono-functional (meth)acrylate having an OH group is preferably the compound represented by the following Chemical formula 1 or Chemical formula 2.

$CH_2=CR^1—COOR^2—OH$      Chemical Formula 1

$CH_2=CR^1—COO—CH_2R^3(OH)—CH_3$      Chemical Formula 2

In the Chemical formula, $R^1$ represents a hydrogen atom or a methyl group, $R^2$ represents an alkylene group having 1 to 4 carbon atoms, and $R^3(OH)$ represents a hydroxyalkylene group having 1 to 4 carbon atoms.

As the compound represented by Chemical formula 1 and Chemical formula 2, 2-hydroxyethyl acrylate, 2-hydroxy propyl acrylate, and 4-hydroxybutylacrylate are preferable.

In addition, mono-functional (meth)acrylate may have a ring structure. Having this ring structure leads to reduction of inner stress. As the compound having a ring structure, the compound represented by the following Chemical formula 3 is preferable. A specific example is 2-hydroxy-3-phenoxypropyl acrylate.

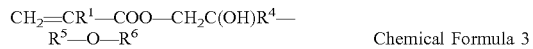

$CH_2=CR^1—COO—CH_2C(OH)R^4—$
$R^5—O—R^6$      Chemical Formula 3

In the Chemical formula 3, $R^1$ represents a hydrogen atom or a methyl group, $R^4$ represents a hydrogen atom or a methyl group, $R^5$ represents an alkylene group having 1 to 4 carbon atoms, and $R^6$ represents a phenyl group or a cycloalkyl group having 3 to 12 carbon atoms.

To demonstrate adhesion to glass, the mono-functional (meth)acrylate preferably accounts for 10 parts by mass or more of a total of 100 parts by mass of di ethylene glycol dimethacrylate and the mono-functional (meth)acrylate and more preferably from 10 to 60 parts by mass to keep inkjet ink within a suitable viscosity range. More preferably, it is from 20 to 60 parts by mass.

Resin

The resin for use in the present disclosure satisfies the conditions 1 and the condition 2. In a case in which two or more resins are contained, viscosity in the condition 1 and the spin-spin relaxation time in the condition 2 are separately measured for the resins and each of the resins satisfies the condition 1 and the condition 2. As the resin satisfying the conditions, it is preferable to have a polystyrene or polyester structure. Specifically, resins satisfying the following condition are preferable.

As the resin having a polystyrene structure, the mass average molecular mass thereof is preferably from 2,000 to 50,000.

As the resin having a polyester structure, the mass average molecular mass thereof is preferably from 2,000 to 50,000.

The resin preferably accounts for 5 to 20 parts by mass, more preferably 10 to 20 parts by mass, and particularly preferably 15 to 20 parts by mass of a total of 100 parts of the diethylene glycol dimethacrylate, the mono-functional (meth)acrylate having an OH group, and the resin in terms of resin's dischargeability and adhesion to a substrate not suitable for adhesion. Since the mixing amount of the resin is 5 parts by mass, dischargeability is improved. In addition, when the mixing amount is 20 parts by mass or less, adhesion for a substrate not suitable for adhesion is enhanced so that discharging at high frequency is possible.

The curable composition of the present disclosure is cured by heat or active energy rays. The curable composition of the present disclosure is also referred to as an active energy ray curable composition but not limited thereto.

Polymerization Initiator

The active energy ray curable composition of the present disclosure may contain a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, radical polymerization initiators are preferable. Moreover, the polymerization initiator preferably accounts for 5 to 20 percent by mass of the total content (100 percent by mass) of the composition to obtain sufficient curing speed.

Specific examples of the radical polymerization initiators include, but are not limited to, aromatic ketones, acylphosphineoxide compounds, aromatic oniumchlorides, organic peroxides, thio compounds (thioxanthone compounds, compounds including thiophenyl groups, etc.), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) can be optionally used together with the polymerization initiator. The polymerization accelerator is not particularly limited. Preferred examples thereof include, but are not limited to, amine compounds such as trimethylamine, methyldimethanolamine, triethanolamine, p-diethylaminoacetophenone, p-dimethylaminoethylbenzoate, p-dimethyl aminobenzoate- 2-ethylhexyl, N,N-dimthylbenzylamine, and 4,4'-bis(diethylamino)benzophenone. The content can be suitably determined to suit to the identification and the content of the polymerization initiator used in combination with the polymerization accelerator.

It is well known that a polymerization initiator is not always necessary for high energy ray source such as electron beams. The description of this mechanism is omitted.

Viscosity

The viscosity of the active energy ray curable composition of the present disclosure has no particular limit and it can be adjusted to suit to a particular application and device. For example, if a discharging device that discharges the composition from nozzles is used, the viscosity thereof is preferably in the range of from 3 to 40 mPa·s, more preferably from 5 to 15 mPa·s, and particularly preferably from 6 to 12 mPa·s in the temperature range of from 20 to 65 degrees C., preferably at 25 degrees C. In addition, it is particularly preferable to satisfy this viscosity range without containing the organic solvent mentioned above. Viscosity can be measured by a cone-and-plate type rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in a range of from 20 to 65 degrees C. VISCOMATE VM-150III can be used for the temperature control of the circulating water.

Curing Device

The device to cure the curable composition of the present disclosure utilizes curing upon application of heat or active energy rays. Curing upon application of active energy rays is preferable.

Active energy rays for use in curing an active energy ray curable composition of the present disclosure are not particularly limited. For example, they are preferred when they can apply energy for polymerization reaction of polymerizable components in the curable composition.

Specific examples include, but are not limited to, electron beams, α ray, β ray, γ ray, and X ray, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source.

Coloring Material

The active energy ray curable composition of the present disclosure may contain a colorant. As the coloring agent, although depending on the objectives and requisites of the composition in the present disclosure, various pigments and dyes can be used, which impart black, white, magenta, cyan, yellow, green, orange, and gloss color such as gold and silver. The proportion of the coloring agent is not particularly limited and determined considering the desired color density and dispersibility of the coloring agent in the curable composition, etc. It is preferable that the proportion of the coloring agent account for 0.1 to 20 percent by mass of the total content (100 percent by weight) of the composition. Incidentally, the active energy ray curable composition of the present disclosure does not necessarily contain a coloring agent but can be clear and colorless.

If no coloring agent is present in a curable composition, the composition is suitable as an overcoat layer to protect an image.

As the pigment, an inorganic or organic pigment can be used alone or in combination.

Specific examples of the inorganic pigment include, but are not limited to, carbon blacks (C.I. Pigment Black 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments. In addition, a dispersant is optionally added to enhance dispersibility of a pigment. The dispersant has no particular limit. For example, it is suitable to use polymer dispersants conventionally used to prepare a pigment dispersion.

The dye includes, for example, an acidic dye, a direct dye, a reactive dye, a basic dye, and a combination thereof.

Organic Solvent

The composition of the present invention may contain an organic solvent, but if possible, it is preferred that the composition be free of an organic solvent. The curable composition free of an organic solvent, in particular volatile organic compound (VOC), is preferable because it enhances safety at where the composition is handled and makes it possible to prevent pollution of the environment. The organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially contained. The proportion is preferably less than 1 percent by mass.

Other Components

The active energy ray curable composition of the present disclosure may contain other known components. The other known components are not particularly limited. Examples are known articles such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Preparation of Active Energy Ray Curable Composition

The active energy ray curable composition of the present disclosure can be prepared by using the components described above. The preparation devices and conditions are not particularly limited.

For example, the curable composition can be prepared by charging a polymerizable monomer, a pigment, a dispersant, etc., into a dispersing machine such as a ball mill, a kitty mill, a disk mill, a pin mill, and a DYNO-MILL to prepare a pigment liquid dispersion followed by mixing with a polymerizable monomer, an initiator, a polymerization initiator, and a surfactant.

Application Field

The application field of the active energy ray curable composition of the present disclosure is not particularly limited. It can be applied to any field where the active energy ray curable composition is used. For example, the curable composition is selected to a particular application and used for a resin for processing, a paint, an adhesive, an insulant, a releasing agent, a coating material, a sealing material, various resists, and various optical materials.

Figure 2:
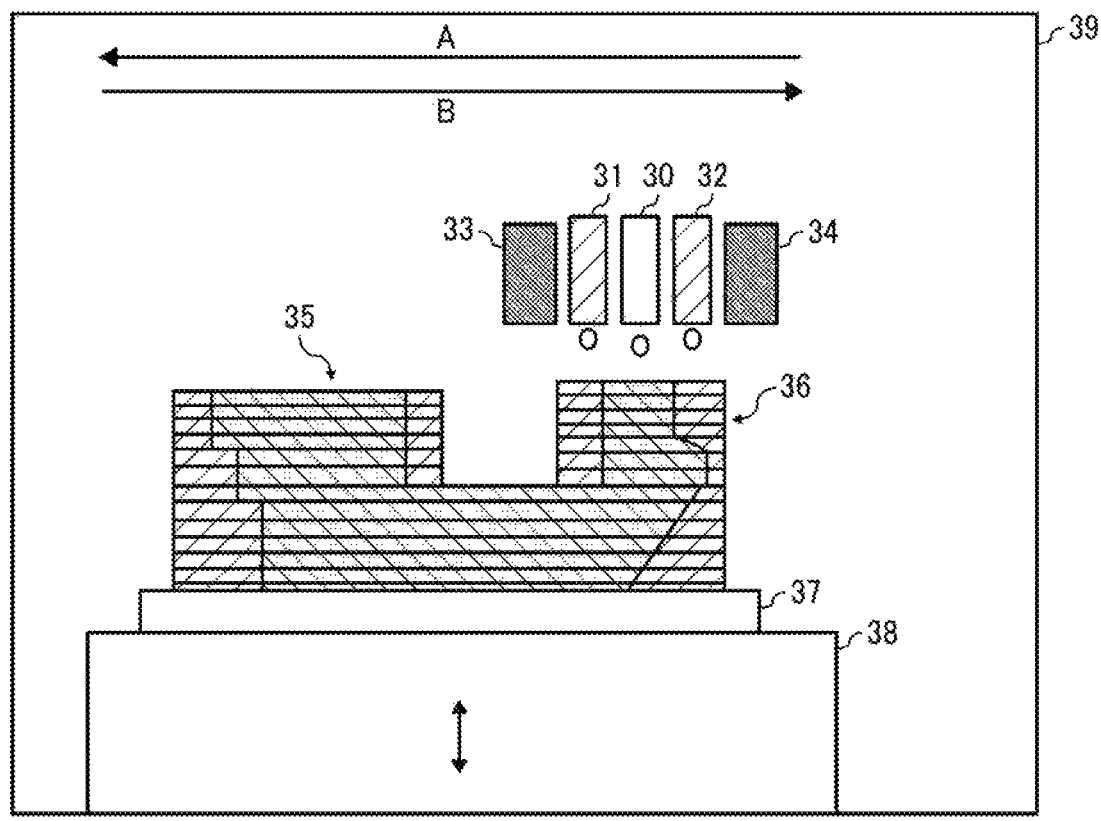
FIG. 2 is a schematic diagram illustrating another example of the image forming device according to an embodiment of the present disclosure.
Figure 3A:
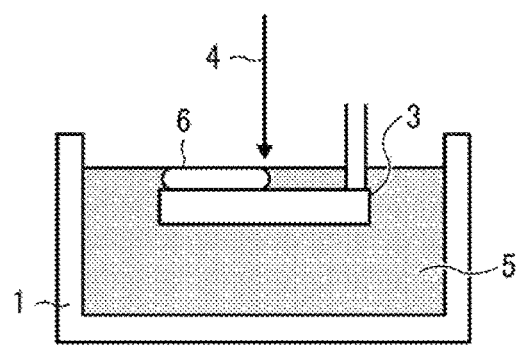
FIGS. 3A, 3B, 3C, and 3D are schematic diagrams illustrating yet another example of the image forming device according to an embodiment of the present disclosure.
Figure 3B:
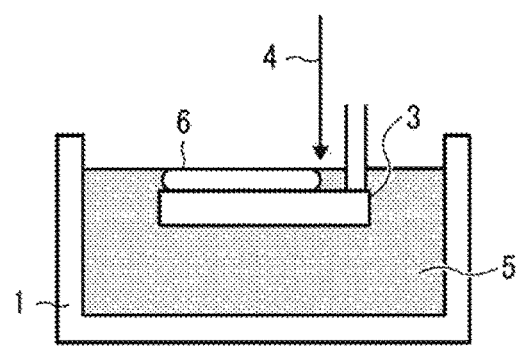
Figure 3C:
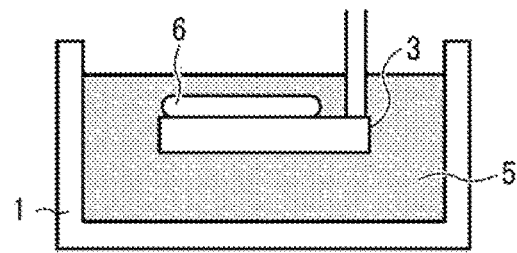
Figure 3D:
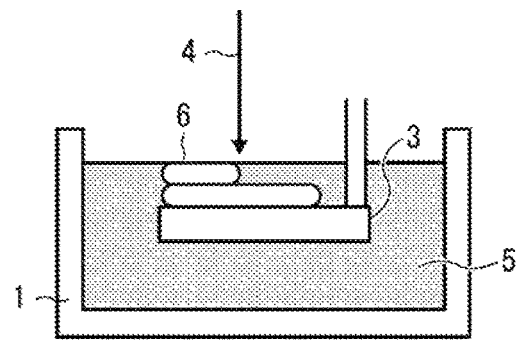

Furthermore, the active energy ray curable composition of the present disclosure can be used as an ink to form two-dimensional texts, images, and designed coating film on various substrates and in addition as a solid object forming material to form a three-dimensional object. This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in additive manufacturing (stereolithography) method as illustrated in FIG. 2 and FIGS. 3A to 3D. FIG. 2 is a diagram illustrating a method of discharging the active energy ray curable composition of the present disclosure to a particular area followed by curing upon irradiation of active energy rays to form a layer and laminating the layers (detail of which is described later).

FIGS. 3A to 3D are diagrams illustrating a method of irradiating a pool (accommodating unit) 1 of the active energy ray curable composition 5 of the present disclosure with active energy rays 4 to form a cured layer 6 having a particular form on a movable stage 3 and sequentially laminating the cured layer 6 so that a solid freeform fabrication object is obtained.

An apparatus for fabricating a solid freeform fabrication object by the active energy ray curable composition of the present disclosure is not particularly limited and can be a known apparatus.

For example, the apparatus includes a accommodating device, a supplying device, and a discharging device of the active energy ray curable composition, and an active energy ray irradiator.

In addition, the present disclosure includes cured matter obtained by curing an active energy ray curable composition and a molded processed product obtained by processing a structure of the cured matter formed on a substrate. The molded processed product is fabricated by, for example, heating drawing and punching cured matter or structures having a sheet-like form or film-like form. For example, the molded product is preferably used when surface-processing is required to be conducted after decorating the surface such as gauges or operation panels of vehicles, office machines, electric and electronic machines, and cameras.

The substrate is not particularly limited. It can be suitably selected to suit to a particular application. Examples are fiber, threads, fabrics, leather, metal, plastic, glass, wood, ceramics, or composite materials thereof. Of these, plastic substrates are preferred in terms of processability.

A substrate having good absorption such as quality paper is good at permeation drying. Therefore, aqueous ink or oil ink which is not quickly dried is practically used therefor. However, it is more practical to use ink having quick drying property for a non-permeating substrate such as matte coating paper, gloss coating paper, plastic film plastic molded products, ceramics, glass, or metal. Such ink immediately cures upon application of irradiation of light so that it is preferable to use the curable composition or ink in the present disclosure. The present disclosure is particularly suitable for non-permeating substrate not suitable for adhesion, in particular, polyethylene terephthalate (PET). A PET substrate is subject to corona treatment to activate the surface thereof to enhance adhesion property in some cases. However, at places where such treatment involving electric spark is not suitable, usage of a curable composition of ink in the present disclosure secure sufficient adhesion without such a treatment.

Image Forming Method and Image Forming Device

The image forming method for use in the present disclosure may utilize active energy rays, heating, etc. To cure the curable composition, an image forming method is executed which includes at least an irradiating step of irradiating the curable composition of the present disclosure with active energy rays, and an image forming device is used which includes an irradiator to irradiate the curable composition with active energy rays and an accommodating unit to accommodate the curable composition of the present disclosure. The accommodating unit may include a container. Furthermore, the method and the device may respectively include a discharging step and a discharging device to discharge the active energy ray curable composition. The method of discharging the curable composition is not particularly limited. Examples are a continuous spraying method and an on-demand method. The on-demand method includes a piezo method, a thermal method, an electrostatic method, etc.

FIG. 1 is a diagram illustrating an image forming device including an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roll 21. Thereafter, light sources 24a, 24b, 24c, and 24d emit active energy rays to the inks to cure the inks so that a color image is formed. Thereafter, the recording medium 22 is conveyed to a processing unit 25 and a printed matter reeling roll 26. Each of the printing unit 23a, 23b, 23c and 23d may include a heating mechanism to liquidize the ink at the ink discharging portion. Moreover, a mechanism may be optionally disposed to cool down the recording medium to around a room temperature in a contact or non-contact manner. In addition, the inkjet recording method may be either of serial methods of discharging an ink onto a recording medium by moving the head while the recording medium intermittently moves according to the width of a discharging head or line methods of discharging an ink onto a recording medium from a discharging head held at a fixed position while the recording medium continuously moves.

The recording medium 22 is not particularly limited.

Specific examples include, but are not limited to, paper, film, ceramics, glass, metal, or complex materials thereof. The recording medium 22 takes a sheet-like form but is not limited thereto. The image forming device may have a simplex printing configuration capable of printing on one side of a recording medium or a duplex printing configuration capable of printing on both sides thereof. The recording medium is not limited to articles used as typical recording media. It is suitable to use corrugated cardboard, building materials such as wall paper and floor material, cloth for apparel such as T-shirts, textile, and leather as the recording media.

Optionally, multiple colors can be printed with no or faint active energy rays from the light sources 24a, 24b, and 24c, followed by irradiation of the active energy rays from the light source 24d. This saves energy and cost.

The recorded matter having images printed with the ink for use in the present disclosure includes articles having printed images or texts on a plain surface of conventional paper, resin film, etc., articles having printed images or texts on a rough surface, or articles having printed image or texts on a surface made of various materials such as metal or ceramic. In addition, by laminating layers of two-dimensional images in part of a recording medium, a partially stereoscopic image (formed of two dimensional part and three-dimensional part) or a three dimensional object can be fabricated.

FIG. 2 is a schematic diagram illustrating an example of the image forming device (device for fabricating a three-dimensional image) relating to the present disclosure. An image forming apparatus 39 illustrated in FIG. 2 forms lamination layers while discharging a first active energy ray curable composition from a discharging head unit 30 for additive manufacturing and a second active energy ray curable composition composed of different ingredients from the first active energy ray curable composition from discharging head units 31 and 32 for a support by using a head unit having inkjet heads disposed movable in the directions indicated by the arrows A and B and curing each composition by ultraviolet irradiators 33 and 34 disposed adjacent to the discharging head units 31 and 32. More specifically, for example, after the discharging head units 31 and 32 for a support discharge the second active energy ray curable composition onto a substrate 37 for additive manufacturing and the second active energy ray curable composition is solidified by irradiation of an active energy ray to form a first support layer having a hollow space for fabrication, the discharging head unit 30 for solid freeform fabrication discharges the first active energy ray curable composition onto the hollow space followed by irradiation of active energy rays for solidification, thereby to form a first additive manufacturing layer. This step is repeated multiple times to suit to the number of lamination while moving the stage 38 up and down in the vertical direction to laminate the support layer and the additive manufacturing layer to fabricate a solid freeform fabrication object 35. Thereafter, a laminated support 36 is removed, if desired. Although only a single discharging head unit 30 for fabrication object is disposed in FIG. 2, the device may have two or more discharging head units 30.

According to the present disclosure, it is suitably possible to discharge a curable composition with a high discharging frequency of from 10 to 20 kHz.

EXAMPLES

Next, the present disclosure is described in detail with reference to Examples and Comparative Examples but not limited thereto.

Examples 1 to 11 and Comparative Examples 1 to 3

The following material was mixed with a mixing ratio shown in Table 2 to obtain curable compositions.
A. Polymerizable Reactive Monomer Component
A1: Diethyleneglycol dimethacrylate NK ester 2G, manufactured by Shin-Nakamura Chemical Co., Ltd.
A2: 4-hydroxybutylacrylate: 4-HBA, manufactured by OSAKA ORGANIC CHEMICAL INDUSTRY LTD.
A3: 2-hydroxyetylacrylate: HEA, manufactured by OSAKA ORGANIC CHEMICAL INDUSTRY LTD.
A4: 2-hydroxypropylacrylate: HPA, manufactured by OSAKA ORGANIC CHEMICAL INDUSTRY LTD.
A5: 2-hydroxy-3phenoxy propylacrylate: epoxyester M-600A, manufactured by Kyoeisha Chemical Co., Ltd.

B: Resin Component
B1: Polystyrene, VS1063, manufactured by SEIKO PMC CORPORATION
B2: Polyester-based resin, VYLON 802 (manufactured by TOYOBO CO., LTD.
B3: Polyester-based resin, VYLON 220 (manufactured by TOYOBO CO., LTD.
B4: Polystyrene, HIMER ST-95, manufactured by polystyrene Polymerization Initiator
C1: IRGACURE® 184, manufactured by BASF (1-hydroxy-cyclohexyl-phenyl-ketone)
C2: IRGACURE® 379, manufactured by BASF (2-(dimethylamino)-2-[(4-methylphenyl)methyl]-1-[4-(4-morphonyl)phenyl]-1-butanone Measuring of Spin-Spin Relaxation Time by CPMG Method of Pulse NMR Analysis The spin-spin relaxation time (T2) was measured by the following device and method.

A pulse NMR (Minispec mq series, manufactured by Bruker) was used as the measuring device.

A liquid mixture of 30 parts by mass of a resin and 70 parts by mass of diethylene glycol dimethacrylate is prepared and 1 mL thereof was weighed and loaded into an NMR tube having a diameter of 10 mm.

The NMR tube was set in the device and 5 seconds later, measuring starts. The solution was measured three times under the following condition and the average of the second time and the third time, the temperatures of which were stable, was used.
First 90 Pulse Separation: 0.01 msec
Final Pulse Separation: 0.2 msec
Number of Data Pint for Fitting: 3,000 points
Cumulated number: 32 times
Temperature: 25 degrees C.

Based on the obtained decay curve, using exponential approximation of ORIGIN 8.5 (manufactured by Origin-Lab), the spin-spin relaxation time (T2) was calculated. The resin was separately measured for the measuring of spin-spin relaxation time.

The results are shown in Table 1.
Measuring of Viscosity
Using the following device and method, viscosity of diethylene glycol dimethacrylate alone was measured at 25 degrees C. and viscosity of a liquid mixture of 70 parts by mass of diethylene glycol dimethacrylate and 30 parts by mass of the resin was measure at 25 degrees C. How many times the viscosity of the liquid mixture was greater than that of the diethylene glycol dimethacrylate alone was checked (increase of viscosity).

Viscosity was measured by a cone plate-type rotary viscometer (VISCOMETER TVE-22L, manufactured by TOKI SANGYO CO., LTD.). The cone rotor used was 1° 34'×R24 at a number of rotation of 50 rpm at a temperature of hemathermal circulating water set at 25 degrees C.

The results are shown in Table 1.

TABLE 1

|  | Viscosity (mPa · s) | Increrase of viscosity (times) | Spin-spin relaxation time (ms) |
| --- | --- | --- | --- |
| Diethylene glycol dimethacrylate: alone | 5.43 | — | — |
| Liquid mixture of 70 parts of diethylene glycol dimethacrylate and 30 parts by mass of polystyrene (B1) | 83 | 15.3 | 233 |

TABLE 1-continued

|  | Viscosity (mPa·s) | Increrase of viscosity (times) | Spin-spin relaxation time (ms) |
|---|---|---|---|
| Liquid mixture of 70 parts of diethylene glycol dimethacrylate and 30 parts by mass of polystyrene (B2) | 143.7 | 26.5 | 184 |
| Liquid mixture of 70 parts of diethylene glycol dimethacrylate and 30 parts by mass of polyester (B3) | 124.5 | 22.9 | 183 |
| Liquid mixture of 70 parts of diethylene glycol dimethacrylate and 30 parts by mass of polyester (B4) | 63.7 | 11.7 | 247 |

Discharging Test

Using a simple atomization device (DropStation, manufactured by "Kabushiki Gaisha Jenesisu"), various curable compositions were subject to measuring of ligament and test of dependency of discharging frequency. Using MH5420 (manufactured by Ricoh Company Ltd.) for the head, the curable composition was discharged at a head temperature of from 24 to 30 degrees C. The discharging condition was set such that the voltage was 19 V and the velocity Vj at which the top of a liquid droplet of the discharged composition passed 1 mm from the nozzle was from 6.5 to 7.5 m/s. The state of jetting was observed using a CMOS camera (ARTCAM-0.36MI, manufactured by ARTRAY. CO., LTD.) disposed vertically to the discharging direction of the ink. In addition to the measuring of ligament and dependency of discharging frequency, the camera was set to be able to observe the liquid droplet from the top of the liquid droplet passing through at 1 mm from the nozzle to the rear of the droplet passing through at 1 mm from the nozzle.

Length of Ligament

A waveform (hereinafter referred to as simple pull waveform) of a pulse rising time of 2 µs, a maintaining time of 2 µs, and a pulse falling time of 2 µs was discharged at a frequency of 2 kHz, and the jetting status was taken by the CMOS camera. The time taken from the top of the liquid droplet passing at 1 mm from the nozzle to the rear of the droplet passing at 1 mm from the nozzle was defined as the length of ligament.

Dependency of Discharging Frequency

The simple pull waveform used in the test was repeatedly discharged at a frequency of 10 kHz and 20 kHz. Whether the liquid droplet was not discharged or whether the liquid droplet was discharged not being connected with another liquid droplet was determined at each frequency. The liquid droplet not discharged or being connected with another liquid droplet at a frequency of less than 20 kHz was evaluated as B and the liquid droplet discharged without connection with another liquid droplet at a frequency of 20 kHz was evaluated as A.

Adhesion Test

Using glass (S9213, thickness of 1.2 mm, manufactured by Matsunami Glass Ind., Ltd.) and a polyethylene terephthalate film (E5100, thickness of 100 µm, manufactured by TOYOBO CO., LTD.) as a substrate, each obtained curable composition was applied to the substrate and cured by ultraviolet rays to form cured matter having a thickness of 5 µm. Thus, a test piece was made. The surface of the polyethylene terephthalate film was treated with corona treatment.

UV curing was conducted under the condition of 0.2 W/cm$^2$ and 3 J/cm$^2$ using a UV irradiator (Light Hammer 6, D valve, manufactured by Fusion).

Adhesion of the thus-obtained applied film to the substrate was evaluated by peeling of transparent pressure-sensitive tape (CELLOTAPE™ CT-18, manufactured by Nichiban Co., Ltd., hereinafter referred to as tape) and attachment to the substrate was evaluated in cases with or without a particular cut according to the cross cut method shown in JIS-K-5600-5-6 format. With a cut, the internal stress is relaxed at the cut as an end portion, which triggers peeling of applied film. Therefore, the evaluation was made under severer conditions. Without a cut, there was no trigger for peeling of applied film so that the evaluation was made in not relatively severe condition. According to the JIS format, adhesion to a substrate is represented by attachability. Technically, both are the same.

The evaluation criteria of the resultant in the tape peeling-off test is as follows:

A: No peeling-off observed after attachment and peeling-off of tape

B: Peeling-off observed after the attachment and peeling-off of tape

The test result in the cross cut method, against the cut of 25 cells of 5×5 cells formed on the applied film, was evaluated as follows:

A: No peeling-off observed after attachment and peeling-off of tape

B: Peeling off observed after attachment and peeling-off of tape Slight peeling-off at an intersection strongly affected by the degree of cut force was ignored.

Combining the results, the adhesion test was evaluated as follows:

S: Tape peeling-off test is A and Cross-cut method is A
A: Tape peeling-off test is A and Cross-cut method is B
B: Tape peeling-off test is B and Cross-cut method is B The results are shown in Table 2.

TABLE 2

| Material | | | Example 1 | Example 2 | Example 3 | Example 4 | Example 5 |
|---|---|---|---|---|---|---|---|
| A | A1 | Diethylene glycol dimethacrylate | 80 | 70 | 70 | 70 | 70 |
|  | A2 | 4-hydroxy butyl acrylate | 10 | 10 | 10 | 10 | — |
|  | A3 | Hydroxy ethyl acrylate | — | — | — | — | 10 |
|  | A4 | Hydroxy propyl acrylate | — | — | — | — | — |

TABLE 2-continued

|   |   | Material | Example 1 | Example 2 | Example 3 | Example 4 | Example 5 |
|---|---|---|---|---|---|---|---|
|   | A5 | 2-hydroxy-3-phenoxy propyl acrylate | — | — | — | — | — |
| B | B1 | VS1063 | 10 | 20 | — | — | — |
|   | B2 | V802 | — | — | 20 | — | 20 |
|   | B3 | V220 | — | — | — | 20 | — |
|   | B4 | ST-95 | — | — | — | — | — |
| C | C1 | IRGACURE® 184 | 10 | 10 | 10 | 10 | 10 |
|   | C2 | IRGACURE® 379 | — | — | — | — | — |
| Dischargeability | | Length of ligament (μs) | 40 | 50 | 50 | 50 | 50 |
|   |   | Discharging frequency dependency | A | A | A | A | A |
| Adhesion property | | PET (corona treatment) | A | S | S | S | S |
|   |   | Glass | A | A | A | A | A |

|   |   | Material | Example 6 | Example 7 | Example 8 | Example 9 | Example 10 |
|---|---|---|---|---|---|---|---|
| A | A1 | Diethylene glycol dimethacrylate | 70 | 70 | 60 | 20 | 20 |
|   | A2 | 4-hydroxy butyl acrylate | — | — | 20 | 60 | 60 |
|   | A3 | Hydroxy ethyl acrylate | — | — | — | — | — |
|   | A4 | Hydroxy propyl acrylate | 10 | — | — | — | — |
|   | A5 | 2-hydroxy-3-phenoxy propyl acrylate | — | 10 | — | — | — |
| B | B1 | VS1063 | — | — | — | — | — |
|   | B2 | V802 | 20 | 20 | 20 | 20 | 20 |
|   | B3 | V220 | — | — | — | — | — |
|   | B4 | ST-95 | — | — | — | — | — |
| C | C1 | IRGACURE® 184 | 10 | 10 | 10 | 10 | — |
|   | C2 | IRGACURE® 379 | — | — | — | — | 10 |
| Dischargeability | | Length of ligament (μs) | 50 | 50 | 50 | 50 | 50 |
|   |   | Discharging frequency dependency | A | A | A | A | A |
| Adhesion property | | PET (corona treatment) | S | S | S | S | S |
|   |   | Glass | A | A | S | S | S |

|   |   | Material | Example 11 | Comparative Example 1 | Comparative Example 2 | Comparative Example 3 |
|---|---|---|---|---|---|---|
| A | A1 | Diethylene glycol dimethacrylate | 85 | 80 | 80 | 70 |
|   | A2 | 4-hydroxy butyl acrylate | 10 | 20 | 10 | — |
|   | A3 | Hydroxy ethyl acrylate | — | — | — | — |
|   | A4 | Hydroxy propyl acrylate | — | — | — | — |
|   | A5 | 2-hydroxy-3-phenoxy propyl acrylate | — | — | — | — |
| B | B1 | VS1063 | 5 | — | — | — |
|   | B2 | V802 | — | — | — | 30 |
|   | B3 | V220 | — | — | — | — |
|   | B4 | ST-95 | — | — | 10 | — |
| C | C1 | IRGACURE® 184 | 10 | 10 | 10 | 10 |
|   | C2 | IRGACURE® 379 | — | — | — | — |

TABLE 2-continued

| | | | | | |
|---|---|---|---|---|---|
| Dischargeability | Length of ligament (μs) | 30 | 30 | 170 | 80 |
| | Discharging frequency dependency | A | A | B | B |
| Adhesion property | PET (corona treatment) | A | B | — | — |
| | Glass | A | B | — | — |

As seen in the results of all of Examples and Comparative Example 1, the curable composition containing a resin was confirmed to have good adhesion property against glass or a PET substrate in comparison with the comparative Example containing no resin.

As seen in the results of all of Examples and Comparative Example 2, discharging frequency dependency was confirmed to be good when the viscosity at 25 degrees C. of a liquid mixture of 70 parts of the diethylene glycol dimethacrylate and 30 parts of the resin was 15 to 27 times greater than that of the diethylene glycol dimethacrylate alone, and the liquid mixture had a spin-spin relaxation time of 240 ms or less as measured by Carr-Purcell-Meiboom-Gill (CPMG) of pulse Nuclear Magnetic Resonance (NMR) analysis.

In addition, as seen in comparison of the results of Example 1 and Example 2, adhesion was confirmed to improve while keeping dischargeability at a certain good level by increasing the mixing amount of the resin.

In addition, as seen in comparison of the results of Example 3 and Example 9, adhesion to glass was confirmed to improve by increasing the content of mono-functional (meth)acrylate having an OH group.

In addition, as seen in comparison of the results of Example 9 and Example 10, dischargeability and adhesion property were confirmed to be good if the identification of the polymerization initiators was different.

Regarding Comparative Example 2 and 3, as the results of dischargeability were evaluated as B, dischargeability and adhesion property did not strike a balance so that adhesion property was not evaluated.

According to the present disclosure, provided is a curable composition having an excellent discharging property and demonstrating excellent adhesion to a substrate or glass, which is not suitable for adhesion.

Having now fully described embodiments of the present invention, it will be apparent to one of ordinary skill in the art that many changes and modifications can be made thereto without departing from the spirit and scope of embodiments of the invention as set forth herein.

What is claimed is:
1. A curable composition comprising:
a polymerizable compound comprising diethylene glycol dimethacrylate and a mono-functional (meth)acrylate having an OH group; and
a resin,
wherein the resin satisfies the following (1) and (2),
(1). a viscosity at 25 degrees C. of a liquid mixture of 70 parts of the diethylene glycol dimethacrylate and 30 parts of the resin is 15 to 27 times greater than that of the diethylene glycol dimethacrylate alone, and
(2). the liquid mixture has a spin-spin relaxation time of 240 ms or less as measured by Carr-Purcell-Meiboom-Gill (CPMG) of pulse Nuclear Magnetic Resonance (NMR) analysis.

2. The curable composition according to claim 1, wherein the resin accounts for 5 to 20 parts by mass of 100 parts of a total of the di ethylene glycol dimethacrylate, the mono-functional (meth)acrylate, and the resin.

3. The curable composition according to claim 1, wherein the resin accounts for 10 to 20 parts by mass of a total of 100 parts of the diethylene glycol dimethacrylate, the mono-functional (meth)acrylate, and the resin.

4. The curable composition according to claim 1, wherein the mono-functional (meth)acrylate comprises a compound represented by Chemical formula 1 or Chemical formula 2, $$CH_2=CR^1-COOR^2-OH \quad \text{Chemical Formula 2}$$

$$CH_2=CR^1-COO-CH_2R^3(OH)-CH_3 \quad \text{Chemical Formula 2}$$

where $R^1$ represents a hydrogen atom or a methyl group, $R^2$ represents an alkylene group having 1 to 4 carbon atoms, and $R^3(OH)$ represents a hydroxyalkylene group having 1 to 4 carbon atoms.

5. The curable composition according to claim 1, wherein the mono-functional (meth)acrylate is 2-hydroxyethylacrylate, 2-hydroxypropylacrylate, or 4-hydroxybutylacrylate.

6. The curable composition according to claim 1, wherein the mono-functional (meth)acrylate has a ring structure.

7. The curable composition according to claim 1, wherein the mono-functional (meth)acrylate comprises a compound represented by the following Chemical formula 3:

$$CH_2=CR^1-COO-CH_2C(OH)R^4-R^5-O-R^6 \quad \text{Chemical Formula 3}$$

where $R^1$ represents a hydrogen atom or a methyl group, $R^4$ represents a hydrogen atom or a methyl group, $R^5$ represents an alkylene group having 1 to 4 carbon atoms, and $R^6$ represents a phenyl group or a cycloalkyl group having 3 to 12 carbon atoms.

8. The curable composition according to claim 1, wherein the mono-functional (meth)acrylate comprises 2-hydroxy-3-phenoxypropyl acrylate.

9. The curable composition according to claim 1, wherein the mono-functional (meth)acrylate accounts for 10 to 60 parts by mass of a total of 100 parts of the diethylene glycol dimethacrylate, the mono-functional (meth)acrylate, and the resin.

10. Cured matter of the curable composition of claim 1.

* * * * *